United States Patent
Narkmon et al.

(10) Patent No.: US 7,945,167 B2
(45) Date of Patent: May 17, 2011

(54) PREVENTING MOBILE COMMUNICATIONS IN A QUIET ZONE USING ARTIFICIALLY IMPOSED SIGNAL TIME DELAY

(75) Inventors: Thanaroj Narkmon, Issaquah, WA (US); Anthony J. Bradley, Renton, WA (US); Kenneth J. Ellis, Sammamish, WA (US)

(73) Assignee: Seamobile, Inc., Seattle, WA (US)

( * ) Notice: Subject to any disclaimer, the term of this patent is extended or adjusted under 35 U.S.C. 154(b) by 714 days.

(21) Appl. No.: 12/035,399

(22) Filed: Feb. 21, 2008

(65) Prior Publication Data
US 2008/0268766 A1 Oct. 30, 2008

Related U.S. Application Data

(60) Provisional application No. 60/891,026, filed on Feb. 21, 2007.

(51) Int. Cl.
*H04B 10/22* (2006.01)
(52) U.S. Cl. ............... 398/116; 398/115; 455/456.4; 455/456.5
(58) Field of Classification Search .......... 398/66, 398/115–117; 455/440, 456.4, 456.5
See application file for complete search history.

(56) References Cited

U.S. PATENT DOCUMENTS

| 6,907,254 B1 | 6/2005 | Westfield | |
|---|---|---|---|
| 2003/0124976 A1* | 7/2003 | Tamaki et al. | 455/15 |
| 2003/0128414 A1 | 7/2003 | Watanabe et al. | |
| 2004/0004780 A1 | 1/2004 | Watanabe | |
| 2005/0020240 A1 | 1/2005 | Minter | |
| 2005/0254542 A1 | 11/2005 | Ahn et al. | |
| 2006/0046746 A1 | 3/2006 | Ranford et al. | |
| 2007/0037566 A1 | 2/2007 | D'Agostino et al. | |

FOREIGN PATENT DOCUMENTS

| EP | 1328078 A1 | 7/2003 |
|---|---|---|
| EP | 1331745 A1 | 7/2003 |
| EP | 1130456 A3 | 9/2003 |
| WO | 02/056506 A2 | 7/2002 |
| WO | 2005/076502 A1 | 8/2005 |

(Continued)

OTHER PUBLICATIONS

Great Britain Search Report dated Mar. 22, 2006 for Great Britain Patent Application No. GB0525537.7 (1 page).

(Continued)

*Primary Examiner* — Leslie Pascal
(74) *Attorney, Agent, or Firm* — K&L Gates LLP

(57) ABSTRACT

Terminating or otherwise preventing communications in a predefined quiet zone by imposing a time delay. In one embodiment an existing call is terminated during a transition between two wireless access points by imposing a time delay on communications through one of the access points. The time delayed signal is interpreted as noise and causes a base station to drop the call if the noise causes the signal strength from the other access point to fall below a threshold. Within a quiet zone, a signal time delay prevents a client device from responding to a base station connection instruction, which causes the base station to believe that the client device is out of range of a quiet zone access point. The time delay may be imposed by an optical fiber spool between the quiet zone access point and the base station, or other delay mechanism. One embodiment is aboard a vessel.

25 Claims, 5 Drawing Sheets

FOREIGN PATENT DOCUMENTS

WO    2006/064240 A1    6/2006

OTHER PUBLICATIONS

Great Britain Search Report dated Apr. 21, 2005 for Great Britain Patent Application No. GB0427374.4 (1 page).
International Search Report mailed Mar. 9, 2006 for International Patent Application No. PCT/GB2005/004842 (2 pages).
U.S. Appl. No. 11/721,966 mailed Jun. 15, 2007 (8 pages).
Preliminary Amendment to U.S. Appl. No. 11/721,966, which was mailed Jan. 22, 2008 (13 pages).
International Search Report and Written Opinion mailed May 30, 2005 for International Patent Application No. PCT/GB2005/000362 (8 pages).
U.S. Appl. No. 10/597,465 mailed Jul. 26, 2006 (8 pages).
Preliminary Amendment to U.S. Appl. No. 10/597,465 mailed Apr. 27, 2007 (16 pages).
International Search Report and Written Opinion mailed Jun. 5, 2008, which issued during the prosecution of International Patent Application No. PCT/US08/54605.

* cited by examiner

PREVENTING MOBILE COMMUNICATIONS IN A QUIET ZONE USING ARTIFICIALLY IMPOSED SIGNAL TIME DELAY

CROSS-REFERENCE TO RELATED APPLICATIONS

This Application is a Non-Provisional of, and claims priority under 35 USC 119(e) to Provisional application No. 60/891,026 filed on Feb. 21, 2007, the entire contents of which are hereby incorporated by reference.

FIELD OF ART

The present invention is directed to electronic communications, and more specifically to preventing mobile communications in an area by imposing a time delay on signals in the area.

BACKGROUND

Mobile electronic devices are commonly used in many locations. However, in some locations, mobile devices can be disturbing. For example, a ringing cell phone can disturb patrons of a movie theatre. A cell phone conversation can be distracting to the cell phone user and to bystanders in a meeting or other event. Unintended radio transmissions may even be dangerous, such as on an aircraft during take-off or landing.

To prevent communications, a jamming signal can be used to create interference. However, jamming can also interfere with desired communication, such as navigation signals. Jamming is also illegal in some countries, because it may interfere with frequencies that are owned by legitimate communication carriers. It may also be difficult to jam all signals if multiple carriers are operating in a certain area. It is desirable to prevent communications in certain locations, or at certain times, without interfering with legitimate uses. It is with respect to these and other issues that the present invention is directed.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

The present invention will now be described with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification, the term "connected" generally means a direct connection between the things that are connected, without any intermediary devices or components, but may mean establishing communications between things that are coupled with intermediary devices. The term "coupled," or "in communication with" means a direct connection between the things that are connected, or an indirect connection through one or more either passive or active intermediary devices or components. The meaning of "a," "an," and "the" include plural references. The meaning of "in" includes "in" and "on." The term "or" is an inclusive "or" operator, and includes the term "and/or," unless the context clearly dictates otherwise. The phrase "in one embodiment," as used herein does not necessarily refer to the same embodiment, although it may. Similarly, the phrase "in another embodiment," as used herein does not necessarily refer to a different embodiment, although it may. The term "based on" is not exclusive and provides for being based on additional factors not described, unless the context clearly dictates otherwise. The term "user" can include a mobile device user, an online service subscriber, a computer user, and/or other person using an electronic device. The term "message" can include a copy of a message.

Briefly stated, embodiments of the invention are described for terminating or preventing communications in a predefined quiet zone. In one embodiment this includes imposing a time delay on communications to induce noise or to indicate that a client device is out of range. The following example embodiment is described in terms of a single-carrier system for mobile communications over a mobile carrier network aboard a vessel. Many other embodiments will be apparent to those of ordinary skill in the art.

Illustrative Operating Environment

Figure 1:
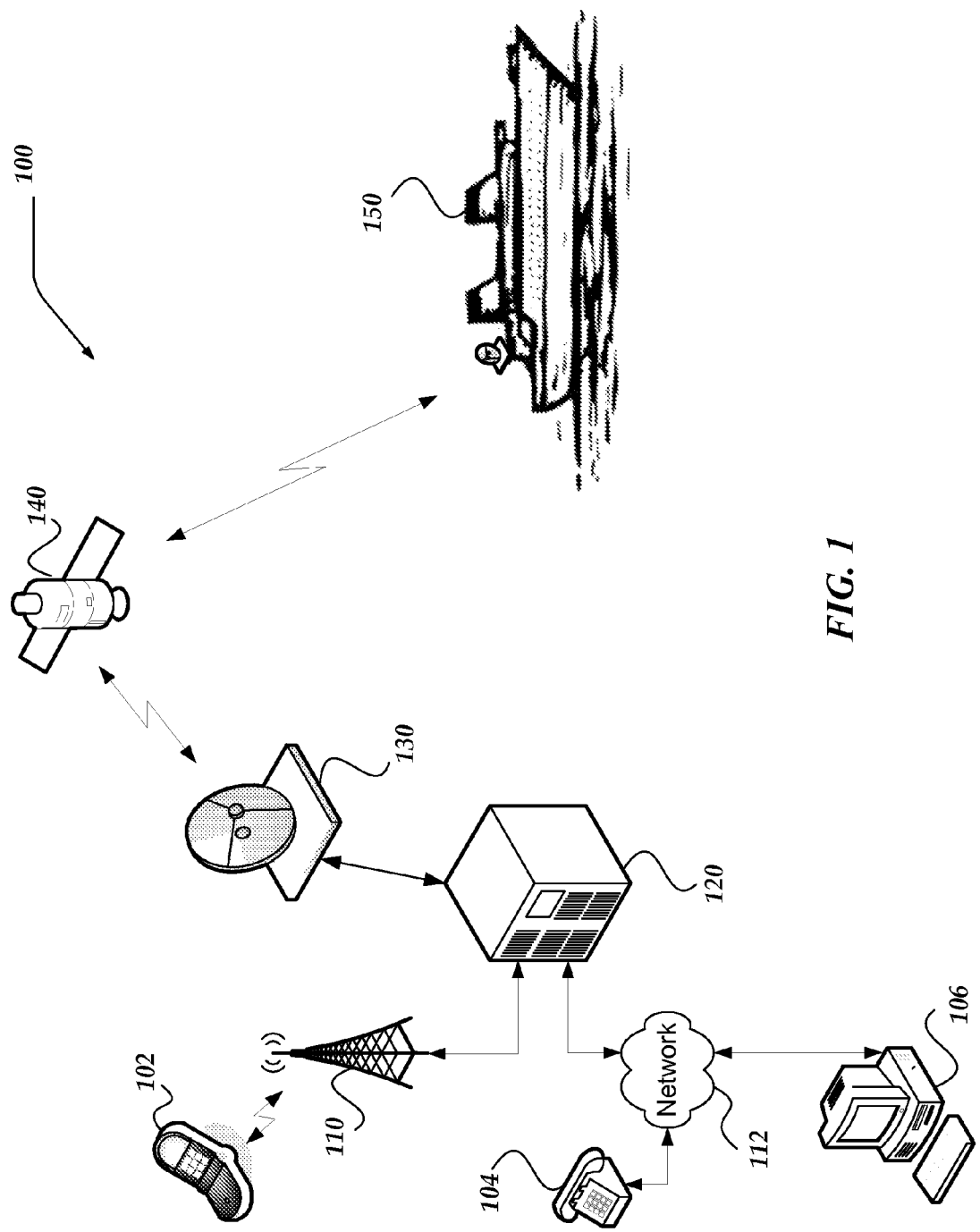
FIG. 1 shows a system diagram of one embodiment of an environment in which the invention may be practiced.

FIG. 1 illustrates one embodiment of an environment in which the present invention may operate. Not all of these components may be required to practice the invention, and variations in the arrangement and type of the components may be made without departing from the spirit or scope of the invention.

As shown in the figure, example system 100 includes client devices 102-106, one or more wireless communication nodes 110, a network 112, a communications base station 120, a satellite communications node 130, a communications satellite 140, and communications sub-network 150. In this example, communication sub-network 150 is included in a vessel, such as a cruise ship. Sub-network 150 generally includes many of the other components shown. In this example, satellite communications node 130, base station 120, network 112, wireless communications node 110, and the client devices illustrate components of ground-based communications system.

Client devices 102-106 may include virtually any communications device capable of receiving and sending a message over a network, such as a cellular network, to and from another communications device, such as base station 120, each other, and the like. The set of such devices may include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client devices 102-106 may be any device that is capable of connecting using a wired or wireless communication medium such as a PDA, POCKET PC, wearable computer, and any other device that is equipped to communicate over a wired and/or wireless communication medium. The set of such devices may also include devices that typically connect using a wired communications medium such as a plain old telephone system (POTS) telephone, personal computers, multiprocessor systems, microprocessor-based or programmable consumer electronics, network PCs, and the like.

Client devices 102-106 may be further configured to send and receive messages to and from other computing devices employing another mechanism, including, but not limited to email, Short Message Service (SMS), Multimedia Message Service (MMS), instant messaging (IM), internet relay chat (IRC), mIRC, Jabber, and the like. The client devices may further send and receive location data, such as global position system (GPS) data.

Some client devices within client devices 102-106 may also include a browser application that is configured to send, receive, and display web pages, and the like. The browser application may be configured to receive and display graphics, text, multimedia, and the like, employing virtually any web based language, including, but not limited to Standard Generalized Markup Language (SMGL), such as HyperText Markup Language (HTML), extensible markup language (XML), Simple Object Access Protocol (SOAP), a wireless application protocol (WAP), a Handheld Device Markup Language (HDML), such as Wireless Markup Language (WML), WMLScript, JavaScript, and the like.

Wireless communications node 110 generally couples mobile communication devices with other communication devices, such as base station 120. Node 110 may comprise a cellular tower, a wireless access point, or other wireless communications node. Node 110 may also include a converter for converting between wired and wireless communications and/or between communication protocols. Node 110 may be used with one or more wireless communications systems, such as Global System for Mobile communications (GSM), Code Division Multiple Access (CDMA), General Packet Radio Service (GPRS), Enhanced Data for GSM Evolution (EDGE), 802.11x, Wireless Application Protocol (WAP), Telocator Alphanumeric Protocol (TAP), Telocator Network Paging Protocol (TNPP), and the like.

Network 112 is configured to couple communication devices to enable them to communicate. Network 112 is enabled to employ any form of electronic or computer readable media for communicating information from one electronic device to another. Also, network 112 may include a wireless interface, such as to a cellular telephone network, and/or a wired interface, such as to a public switched telephone network (PSTN). Wireless interfaces may support various communication capabilities, including GSM, CDMA, GPRS, EDGE, 802.11x, WAP, TAP, TNPP, Simple Network Paging Protocol (SNPP), Simple Mail Transfer Protocol (SMTP), Short Message Service (SMS), Multi-Media Message Service (MMS), Short Message Peer to Peer (SMPP), IP (wireless), and the like.

Wireless interfaces may communicate with wired interfaces such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Communication interfaces may include HyperText Transport Protocol (HTTP), transport control protocol/internet protocol (TCP/IP), interfaces, and the like. Furthermore, remote computers and other related electronic devices could be remotely connected to either LANs or WANs via a modem and temporary telephone link. In essence, network 112 includes any communication method by which information may travel between client devices 102-106, base station 120, and/or other communication components.

The media used to transmit information in communication links as described above illustrates one type of electronic media, namely communication media. Generally, electronic media includes any media that can be accessed by an electronic device. Electronic media may include communication media, storage media, or any combination thereof.

Additionally, communication media typically embodies machine-readable instructions, data structures, program modules, or other data. Such data may be stored on an electronic storage device, held in an electronic memory, and/or transmitted over a communication media. Transmission may incorporate the data in a modulated data signal such as a carrier wave, data signal, or other transport mechanism and includes any information delivery media. The terms "modulated data signal," "carrier-wave signal," and "electromagnetic signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as RF, satellite, infrared, acoustic, and other wireless media.

Base station 120 and satellite communications node 130 may comprise multiple electronic devices or a single electronic device. Base station 120 may provide communication services such as call management, signal quality evaluation, multiplexing, routing, monitoring, statistical analysis, inter-carrier messaging for cellular phone users, data collection and analysis services from mobile device users, and/or the like. Satellite communications node 130 may provide communication services such as transmission, receipt, conversion, multiplexing, routing, and/or other services with one or more satellites, such as satellite 140. Devices that may operate with base station 120 and satellite communications node 130 include signal processors, multiplexers, routers, bridges, transformers, servers, personal computers, desktop computers, multiprocessor systems, microprocessor-based or programmable consumer electronics, network PCs, and the like.

Figure 2:
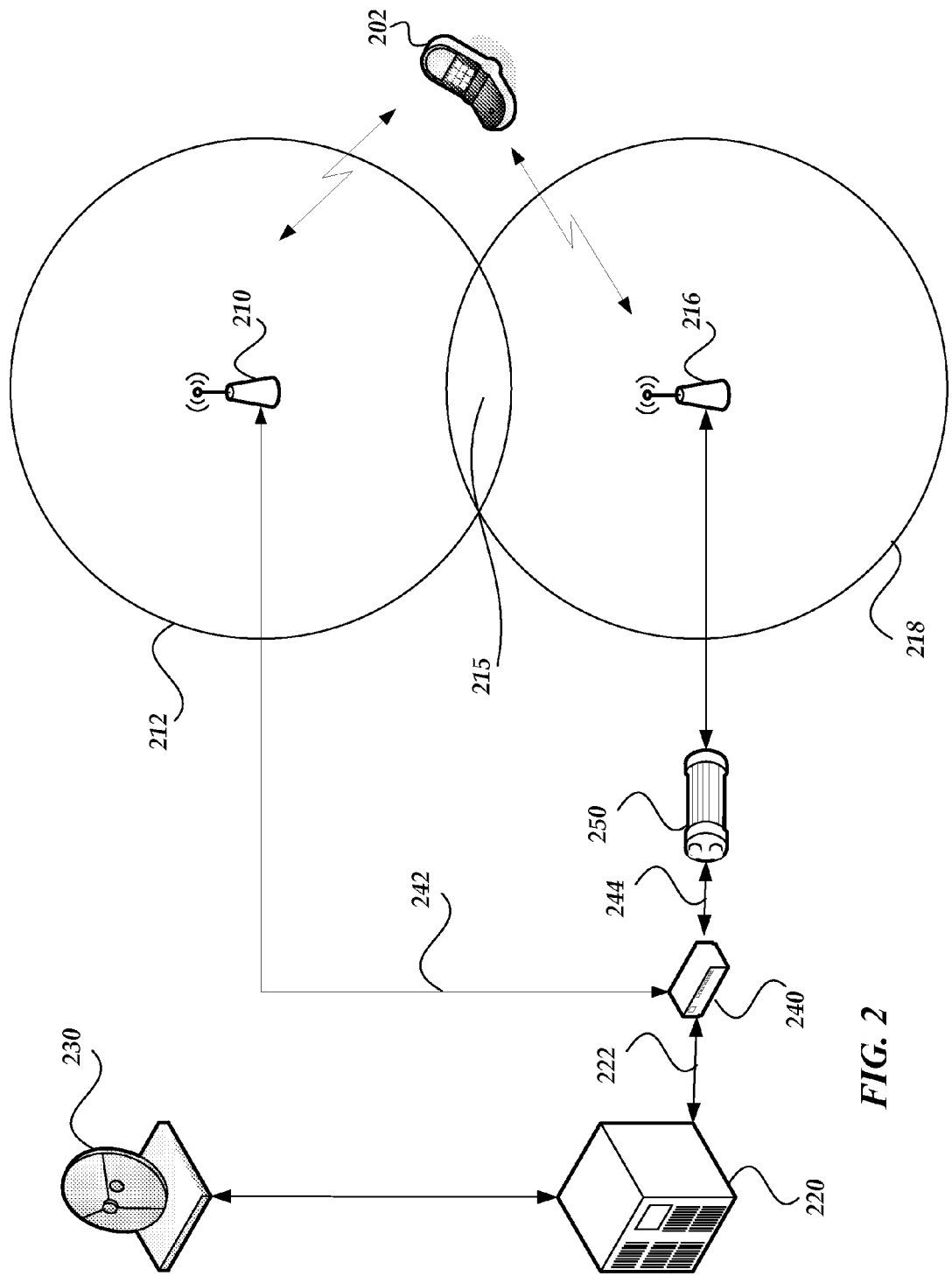
FIG. 2 shows a functional block diagram of an example architecture according to one embodiment of the invention.

FIG. 2 is a functional block diagram illustrating an architecture of an example embodiment of the present invention. In this embodiment, the architecture represents a sub-network aboard a vessel, such as a ship, an aircraft, or the like. Other embodiments may be implemented in other vehicles, such as trains, busses, automobiles, or the like. Further embodiments may be implemented to control certain areas, such as all or portions of a building, a military base, a campus, a city, or the like. To make the following discussion easier to understand, the sub-network is controlled by a single communication service. This may be the case aboard a ship that operates in international waters in which network carriers do not control certain portions of the communications spectrum. Multiple services can be controlled by duplicating components discussed below, by multiplexing, and/or other techniques.

Each component of this example architecture may use one, or a combination of wired and wireless communications. A gateway, such as a satellite communication node 230 is shown coupled to a base station 220, each of which may be similar to those described above with regard to FIG. 1. Base station 220 is coupled to, or includes a radio frequency (RF) coupling 222 that is coupled to an optical converter 240, in this embodiment. The optical converter converts RF signals to optical signals and vise versa. Optical converter 240 may also split, route, switch, or otherwise distribute or consolidate signals. Optical signals are communicated through optical media such as optical fibers 242 and 244. Optical fiber 242 is coupled to an open zone wireless access point 210, which may comprise another converter to transform optical signals into wireless RF signals and vise versa. Wireless access point 210 generally includes an antenna and provides a coverage area that is referred to here as an open zone 212.

Another optical fiber 244 is coupled to a signal delay component 250, which is coupled to a quiet zone wireless access point 216. Quiet zone wireless access point 216 also includes another antenna and another converter to transform optical signals between wireless RF signals and optical signals. Quiet zone wireless access point space 216 provides a coverage area that is referred to here as a quiet zone 218. The quiet zone may comprise a room, a theater, and/or another area in which mobile communications are not desired. The open zone and the quiet zone may overlap at an overlapping area 215.

To prevent mobile communications in quiet zone 218, delay component 250 is used to impose an artificial delay on signals between wireless access point 216 and base station 220. In one embodiment, delay component 250 comprises one or more spools of optical fiber, which will lengthen the amount of time required for communications to transmit between quiet zone wireless access point 216 and base station 220. For example, a 2 km spool of optical fiber may introduce a delay of approximately 16 µs. One spool may be used for transmissions from optical converter 240 to quiet zone wireless access point 216, and another spool may be used for transmissions from quiet zone wireless access point 216 to optical converter 240. Delay component 250 may include a switch to bypass either, or both optical spools. Bypassing the spools would enable communications in quiet zone 218, which may be desired at certain times of the day, on certain days, and/or for particular reasons. Delay component 250 may alternatively comprise a timer, a buffer, and/or other component that may be used to impose a signal delay. The delay component may also include one or more interfaces to the base station, one or more interfaces to one or more quiet zone access points, a housing, and/or other components, such as those in the base station. In addition, or alternatively, optical converter 240 and/or base station 220 may include a delay component or a delay process.

When the artificial delay is active, a client device, such as a cell phone 202, will operate normally while within open zone 212. However, as the client device moves into overlap zone 215, existing communication will be dropped as a result of time delay interference from quiet zone 218. While in quiet zone 218, the artificially imposed time delay will prevent the client device from establishing communications with base station 220. The effects of the time delay are described in further detail below, with regard to example operations of the base station and client devices.

Figure 3:
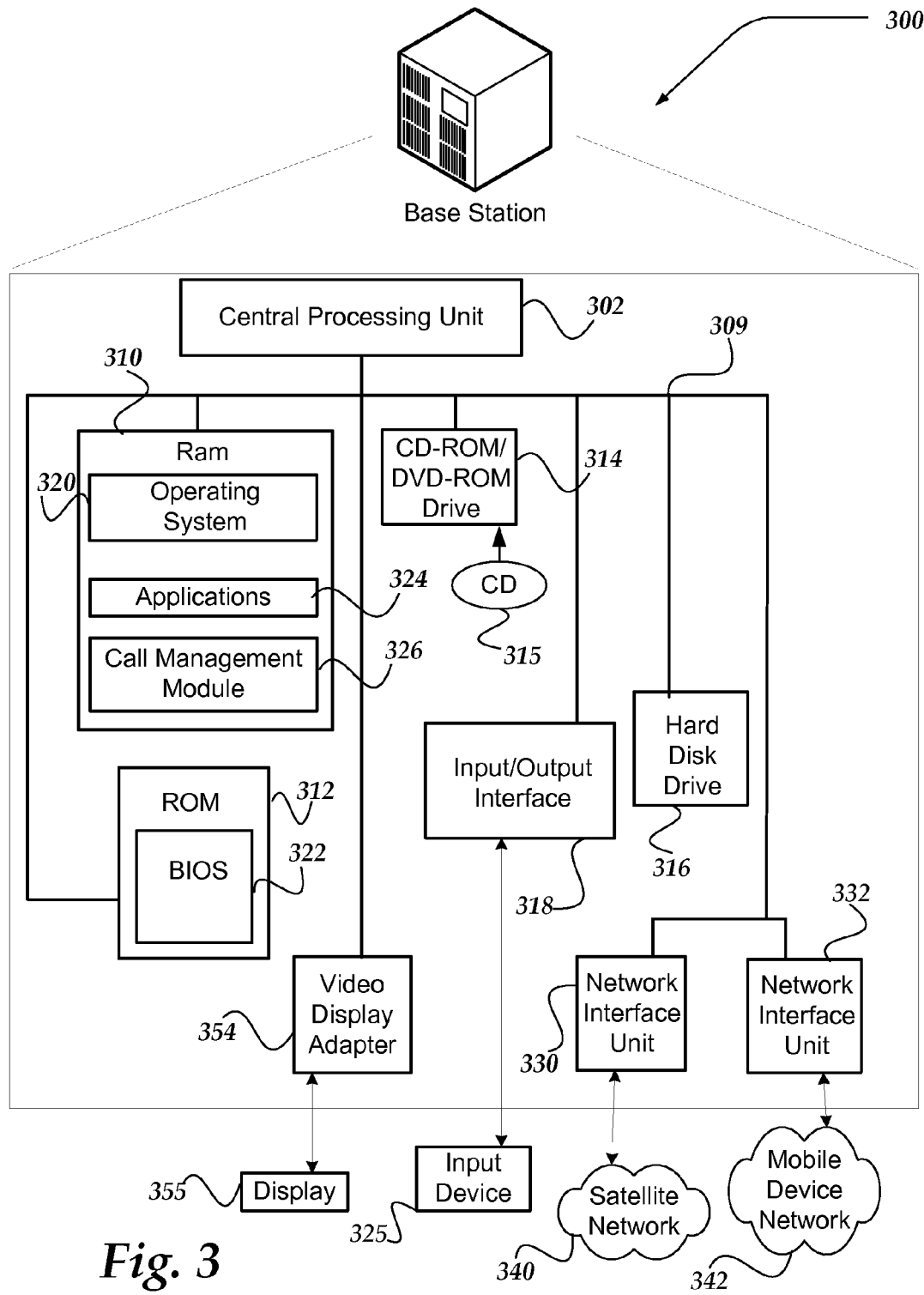
FIG. 3 shows a functional block diagram of an example base station according to one embodiment of the invention.

FIG. 3 shows a functional block diagram of an example base station according to one embodiment of the invention. This example base station is configured similar to a computing device to enable a variety of processes. Other embodiments may comprise a specialized device with more limited capabilities. Base station 300 includes a processing unit 302, network interface units 330 and 332, and a mass memory, all in communication with each other via a bus 309. The mass memory generally includes RAM 310, ROM 312, and one or more permanent mass storage devices, such as an optical drive 314 that can read a machine readable medium such as a CD 315, a hard disk drive 316, a tape drive, a floppy disk drive, and/or the like. The mass memory stores an operating system 320 for controlling the operation of base station 300. A general-purpose operating system or a specialized operating system may be employed. In addition, or alternatively, a basic input/output system ("BIOS") 322 is also provided for controlling low-level operation of base station 300.

The mass memory also includes machine-readable media, such as volatile, nonvolatile, removable, and non-removable media implemented in any method or technology for storage of information, such as machine readable instructions, data structures, program modules, parameter settings, and/or other data. Examples of machine-readable media include RAM, ROM, EEPROM, flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by an electronic device.

The mass memory also stores program code and data. One or more applications 324 are loaded into mass memory and run on operating system 320. Examples of application programs include configuration management programs, database programs, schedulers, transcoders, statistical analysis programs, and the like. Other applications may include data loggers, error processors, email programs, calendars, web services, word processing programs, spreadsheet programs, and so forth. Mass storage further includes applications such as a call management module 326 for managing communications between client devices and a satellite communications node. Call management module 326 may also include, or interface with a database for storing settings, such as an interference threshold, a delay limit, and/or other parameters.

Base station 300 may also includes a video display adapter 354 that can drive a display 355, and may include an input/output interface 318 for communicating with external devices, such as a mouse, keyboard, scanner, or other input device 325. Base station 300 can communicate with a local network, the Internet, a telephone network, or some other communications network via network interface units 330 and 332, which are constructed for use with various communication protocols including code division multiple access (CDMA), time division multiple access (TDMA), global system for mobile communications (GSM), Institute for Electrical and Electronics Engineers (IEEE) 802.11, IEEE 802.16 (WiMax), SMS, general packet radio service (GPRS), Wireless Application Protocol (WAP), transmission control protocol/Internet protocol (TCP/IP), user datagram protocol (UDP), and the like. Network interface units 330 and 332 are sometimes known as transceivers, transceiving devices, network interface cards (NICs), and the like. The network interface units can facilitate communications between communication carriers, client communication devices, and/or computing devices that conform to the same or differing communication protocols. For example, network interface units 330 and 332 are illustrated as communicating with a satellite network 340 and a mobile device network 342, as described above.

Illustrative Process Flows

Figure 4:
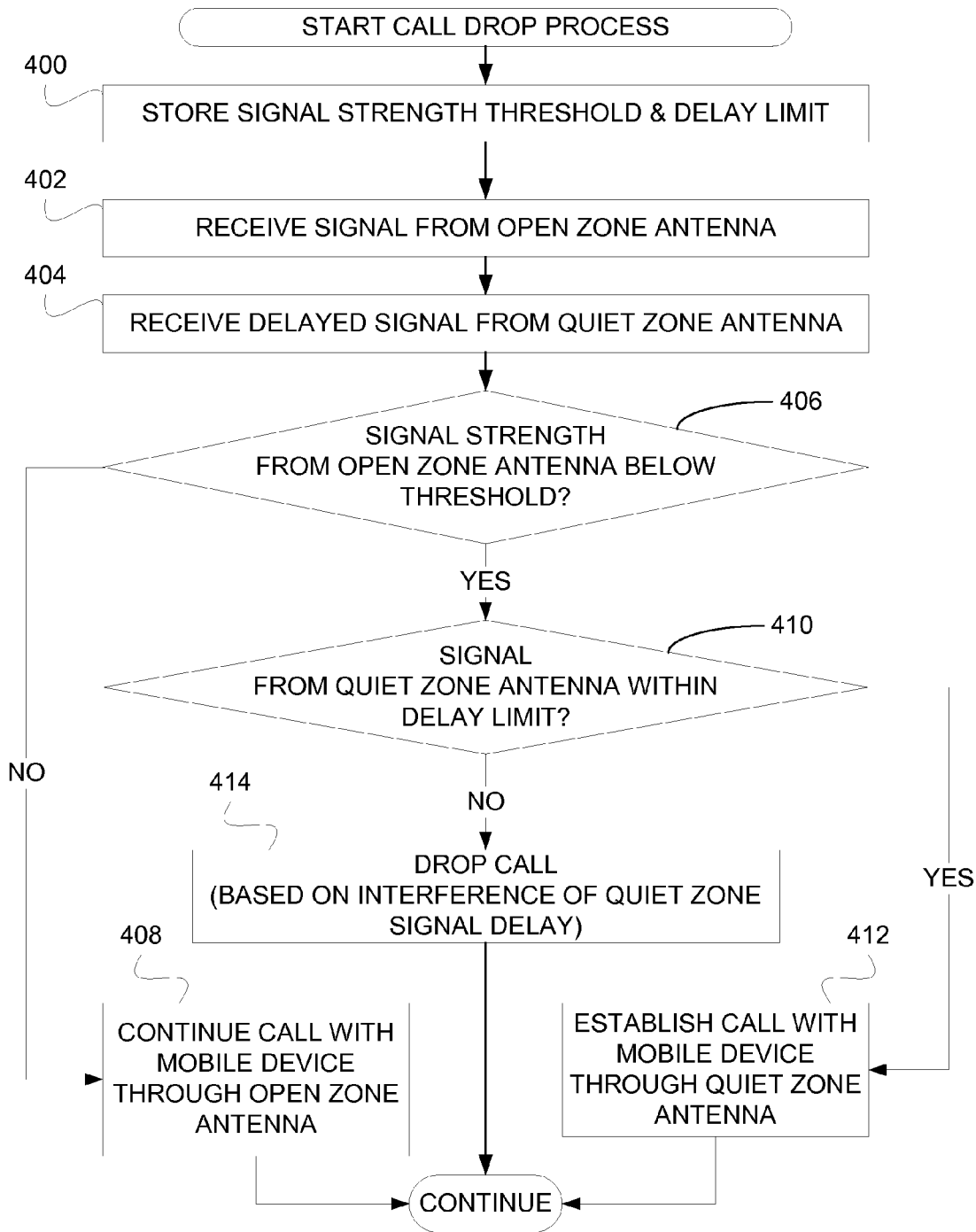
FIG. 4 is a flow diagram illustrating an example process for interrupting communications as a mobile device enters a quiet zone, according to one embodiment of the present invention.

FIG. 4 is a flow diagram illustrating an example process for interrupting communications as a mobile device enters a quiet zone, according to one embodiment of the present invention. At an operation 400, the base station stores a signal strength threshold and a delay limit, which are entered by a system administrator. During normal operation, the base station receives a signal from an open zone wireless access point, at an operation 402. Conversely, the base station may transmit signals to the open zone wireless access point for broadcast to a client device. While the client device remains in the open zone, mobile communications operate normally.

As the client device enters the overlap zone, the base station begins to receive a delayed signal from the quiet zone wireless access point, at an operation 404. The delayed signal will generally be at the same frequency and on the same channel as the signal from the open zone wireless access point. In addition, or alternatively, both signals may include a device ID, phone number, or other identifier of the client device. Consequently, the base station associates both signals with the same client device. At a decision operation 406, the base station determines whether the signal strength from the open zone has fallen below the signal strength threshold, such that the base station should switch control over to the quiet zone wireless access point to continue communication with the client device. If the signal strength from the open zone wireless access point remains above the signal strength threshold, the base station continues the call with the client device through the open zone wireless access point, at an operation 408.

However, if the signal strength from the open zone wireless access point has fallen below the signal strength threshold, the base station attempts to switch the call over to the quiet zone wireless access point. The base station generally sends a connection request to the quiet zone wireless access point and waits for an acknowledgment. At a decision operation 410, the base station determines whether the acknowledgment was received within the delay limit. If the acknowledgment was received within the delay limit, the base station establishes communication with the client device through the quiet zone wireless access point, at an operation 412. This may occur when the delay component is switched to bypass the delay spool, so that communications may be allowed within the quiet zone.

If the acknowledgment is not received within the delay limit, the base station interprets the signal from the quiet zone wireless access point as noise. The base station uses the signal to noise ratio in its determination of whether the signal strength from the open zone wireless access point is below the signal strength threshold. For example, a signal to noise ratio of 10/1 may correspond to a signal strength threshold of 10 db/1 db. If the signal strength threshold is exceeded, and the base station can not establish communication through the quiet zone wireless access point, the base station drops the call, at an operation 414. The base station essentially concludes that the signal from the quiet zone interferes too much with the signal from the open zone, on the same channel, so the base station can not maintain a connection in either zone with sufficient signal to noise ratio. When dropping the call, the base station may record the phone number(s), device IDs, time, and/or other information about the dropped call.

Figure 5:
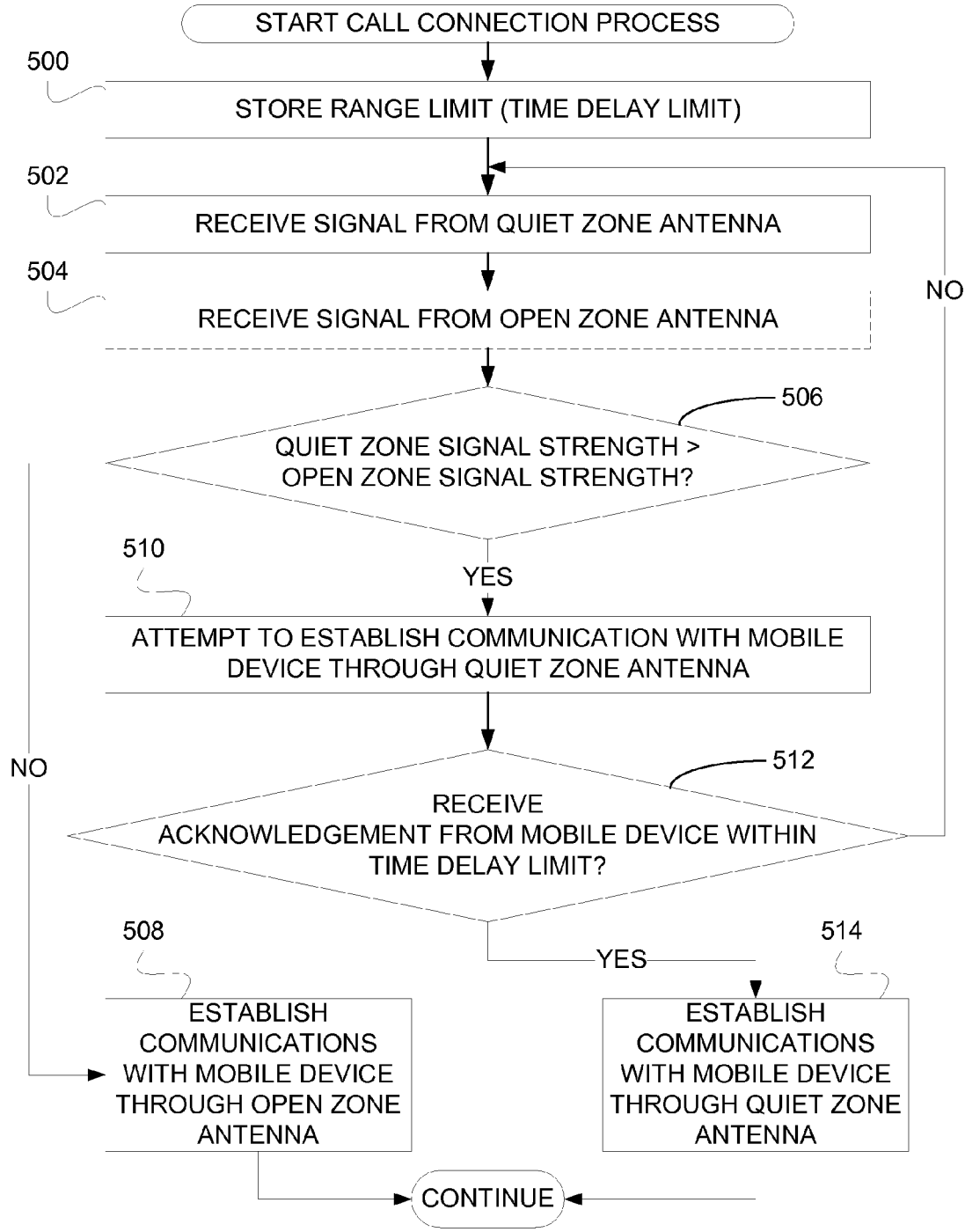
FIG. 5 is a flow diagram illustrating an example process for preventing communications in a quiet zone, according to one embodiment of the present invention.

Within the quiet zone, the client device may then attempt to establish communication with the base station. FIG. 5 is a flow diagram illustrating an example process for preventing communications in the quiet zone, according to one embodiment of the present invention. At a prior configuration operation 500, the base station stores a range limit, which may be the same or different from the time delay limit. At an operation 502, the base station receives a connection request from the client device through the quiet zone wireless access point. At an optional operation 504, the base station may also receive the connection request through the open zone wireless access point. This may be the case if the client device is still within the overlap area. At a decision operation 506, the base station determines whether the quiet zone signal strength is greater than the open zone signal strength. If the quiet zone signal strength is less than the open zone signal strength, and the signal to noise ratio has not reduced the open zone signal strength below the signal strength threshold, the base station establishes communications with the mobile device through the open zone wireless access point, at an operation 508. This might occur if the mobile client device is within the overlap zone, but close enough to the open zone wireless access point to provide sufficient signal strength. This may be useful if a relatively large transition zone is desired to enable a caller to inform a call recipient that the caller is entering a quiet zone.

If the quiet zone signal strength is greater than the open zone signal strength, the base station responds to the client device's connection request and attempts to establish communication with the client device through the quiet zone wireless access point, at an operation 510. At a decision operation with 512, the base station receives an acknowledgment from the client device through the quiet zone wireless access point, and determines whether the acknowledgment was received within the range limit time delay. If the acknowledgment was received within the range limit time delay, the base station would believe that the client device is within range of the quiet zone wireless access point. This may be the case when the delay spool is bypassed, or the delay is otherwise switched off, so that client devices may communicate through the quiet zone wireless access point. In that case, the base station establishes communication with the client device through the quiet zone wireless access point, at an operation 514.

However, if the acknowledgment is not received within the range limit time delay, the base station concludes that the client device is out of range of the quiet zone wireless access point. The base station will then refuse to establish communication with the client device. The client device will generally believe that it has sufficient signal strength from the quiet zone wireless access point, but it will not be allowed to connect to the base station. Thus, the client device may attempt to search for an alternate base station. In a closed system, such as aboard a vessel with only a single service provider, the client device will fail to find another available base station. In a multi-provider environment, the delayed acknowledgment may be distributed to multiple base stations, so that each base station will believe that the client device is out of range from the quiet zone wireless access point.

The above specification, examples, and data provide a complete description of the manufacture and use of the composition of the invention. For example, in one embodiment, the confirmation messages and replies may be provided orally via mobile or land telephones. Since many embodiments of

What is claimed as new and desired to be protected by Letters Patent is:

1. A system for controlling communications, comprising:
   a base station with a predefined signal parameter threshold, which when crossed, prevents communication with the base station; and
   a delay control component coupled to the base station and coupled to a client device, wherein the delay control component selectively imposes a time delay on a signal between the client device and the base station to selectively control a signal parameter of the signal, thereby controlling whether the signal parameter crosses the signal parameter threshold.

2. The system of claim 1 wherein the signal parameter threshold comprises an acknowledgement period within which a connection request must be acknowledged to establish communication between the base station and the client device, and wherein the delay component selectively causes a connection request acknowledgement to be delayed beyond the acknowledgement period.

3. The system of claim 1 wherein the signal parameter threshold comprises a signal to noise ratio threshold, below which communication is prevented between the base station and the client device, wherein the base station compares the signal to noise ratio threshold to a signal to noise value that is based on:
   an open zone signal received by the base station through an open zone access point coupled between the base station and the client device; and
   a quiet zone signal received by the base station through the delay control component that is coupled to an open zone access point, which is coupled to the client device.

4. The system of claim 1 further comprising:
   a quiet zone wireless access point coupled between the delay control component and the client device, the quiet zone wireless access point providing a quiet zone area, within which wireless communication between the client device and the base station is selectively controlled by the delay control component; and
   an open zone wireless access point coupled between the base station and the client device, the open zone wireless access point providing an open zone area in which wireless communication between the client device and the base station is not controlled by the delay control component; and wherein the open zone area partially overlaps with the quiet zone area in an overlap area in which wireless communication between the client device and the base station is controlled by the delay control component if a quiet zone signal strength exceeds an open zone signal strength.

5. The system of claim 1 wherein the delay control component comprises an optical fiber that causes a signal to propagate along the optical fiber for a period that causes the predefined signal parameter threshold to be crossed.

6. The system of claim 1, wherein the delay control component comprises:
   a first optical fiber coupled between a transmitter of the base station and the client device; and
   a second optical fiber coupled between a receiver of the base station and the client device.

7. The system of claim 1, further comprising an optical converter coupled between the base station and the delay control component, wherein the optical converter converts between radio frequency signals and optical signals.

8. The system of claim 1, further comprising a gateway coupled to the base station, the gateway enabling communication between the base station and a remote network.

9. The system of claim 1, further comprising a vessel carrying the base station and the delay control component.

10. A delay device for controlling communications, comprising:
    a base station interface for communication with a base station;
    an access point interface for communication with a client access point; and
    an optical fiber coupled between the base station interface and the access point interface, wherein the optical fiber has a length that causes a time delay in a signal propagating between the base station interface and the access point interface, wherein the time delay exceeds a predefined threshold period for enabling communication between a base station and a client device.

11. The delay device of claim 10, further comprising a switch coupled to coupled to the optical fiber for selectively coupling the optical fiber to a different optical fiber having a length that does not causes a time delay in the signal propagating to exceed the predefined threshold period.

12. A base station for controlling communication, comprising:
    a processor,
    an open zone communication interface coupled to the processor;
    a quiet zone communication interface coupled to the processor; and
    a memory coupled to the processor and storing processor readable instructions that cause the processor to perform a plurality of operations, including:
      receiving a first communication at a first signal strength through the open zone communication interface;
      receiving a second communication at a second signal strength through the quiet zone communication interface;
      determining that the first communication and the second communication indicate that they are both from the same client device;
      determining whether the first signal strength is below a predefined signal strength threshold, and whether the second signal strength exceeds the first signal strength;
      sending a connection request through the quiet zone communication interface to the client device, if the first signal strength is below the predefined signal strength threshold, and the second signal strength exceeds the first signal strength; and
      terminating communication with the client device through the quiet zone communication interface, if a connection acknowledgement is not received from the client device within a predefined delay limit.

13. The base station of claim 12, wherein the processor readable instructions further cause the process to perform the operations of:
    receiving through the quiet zone communication interface, a communication connection request identifying the client device;
    transmitting a client acknowledgement request to the client device through the quiet zone communication interface;
    receiving from the quiet zone communication interface, a client acknowledgement from the client device; and
    determining that the client acknowledgement was received after a predefined delay period, such that a communication connection is not established with the client device.

14. The base station of claim 13, further comprising a delay device coupled to the quiet zone communication interface, causing a delay in at least one of the following:
- receipt of the second communication;
- the connection acknowledgement;
- the communication connection request;
- the client acknowledgement request; and
- the client acknowledgement.

15. The base station of claim 12, wherein the delay limit is less than a delay induced by signal transmission through a length of optical fiber.

16. The base station of claim 12, wherein the processor readable instructions further cause the process to perform the operation of establishing a communication session with the client device through the quiet zone communication interface if the first signal strength is below the predefined signal strength threshold, the second signal strength exceeds the first signal strength, and a connection acknowledgement is received from the client device within a predefined delay limit.

17. A communication controller, comprising:
- a processor;
- a quiet zone communication interface coupled to the processor;
- a delay control component coupled to the quiet zone communication interface; and
- a memory coupled to the processor and storing processor readable instructions that cause the processor to perform a plurality of operations, including:
  - receiving a communication connection request from a client device through the quiet zone communication interface;
  - transmitting through the quiet zone communication interface, an acknowledgement request to the client device in response to the communication connection request;
  - receiving through the quiet zone communication interface and through the delay control component, an acknowledgement from the client device;
  - determining whether the acknowledgement was received after a predefined delay period; and
  - selecting not to establish a communication session with the client device if the acknowledgement was received after the predefined delay period.

18. The communication controller of claim 17, further comprising a switch coupled to the delay control component, wherein the processor readable instructions further cause the processor to perform the operations of:
- activating the switch to switch off the delay control component; and
- selecting to establish a communication session with the client device if the acknowledgement was received within the predefined delay period.

19. The communication controller of claim 17, wherein the delay component comprises one of the following: a length of optical fiber, a buffer, and a timer.

20. The communication controller of claim 17, wherein the predefined delay period is less than a delay induced by signal transmission through a length of optical fiber.

21. A method of producing a storage device with stored data, comprising:
- receiving a first communication at a first signal strength from an open zone access point;
- receiving a second communication at a second signal strength from a quiet zone access point;
- determining that the first communication and the second communication indicate that they are both from the same client device;
- determining whether the first signal strength is below a predefined signal strength threshold, and whether the second signal strength exceeds the first signal strength;
- sending a connection request through the quiet zone access point to the client device, if the first signal strength is below the predefined signal strength threshold, and the second signal strength exceeds the first signal strength;
- terminating communication with the client device, if a connection acknowledgement is not received from the client device within a predefined delay limit; and
- storing on a storage device, an indication that the communication with the client device was terminated, if the communication was terminated.

22. The method of claim 21, further comprising:
- receiving from the quiet zone access point a communication connection request identifying the client device;
- transmitting a client acknowledgement request to the quiet zone access point for transmission to the client device;
- receiving from the quiet zone access point a client acknowledgement from the client device;
- determining that the client acknowledgement was received after a predefined delay period, such that a communication connection is not established with the client device; and
- storing on the storage device, an non-connection indication that the communication connection was not established with the client device.

23. A method for controlling communication, comprising:
- receiving a first communication at a first signal strength from an open zone access point;
- receiving a second communication at a second signal strength from a quiet zone access point;
- determining that the first communication and the second communication indicate that they are both from the same client device;
- determining whether the first signal strength is below a predefined signal strength threshold, and whether the second signal strength exceeds the first signal strength;
- sending a connection request through the quiet zone access point to the client device, if the first signal strength is below the predefined signal strength threshold, and the second signal strength exceeds the first signal strength; and
- terminating communication with the client device, if a connection acknowledgement is not received from the client device within a predefined delay limit.

24. A machine readable medium storing machine readable instructions that cause a processor to perform the operations of claim 23.

25. A machine readable medium storing machine readable instructions that cause a processor to perform the operations of:
- receiving a communication connection request from a client device;
- transmitting an acknowledgement request to the client device in response to the communication connection request;
- receiving an acknowledgement from the client device through a delay control component;
- determining whether the acknowledgement was received after a predefined delay period; and
- selecting not to establish a communication session with the client device if the acknowledgement was received after the predefined delay period.

* * * * *